United States Patent [19]

Ferguson

[11] 4,155,648
[45] May 22, 1979

[54] OPTICAL PIPE END-SQUARENESS GAUGE

[75] Inventor: Henry B. Ferguson, Elyria, Ohio

[73] Assignee: United States Steel Corporation, Pittsburgh, Pa.

[21] Appl. No.: 894,314

[22] Filed: Apr. 7, 1978

[51] Int. Cl.² .............................................. G01C 1/00
[52] U.S. Cl. .................................... 356/140; 33/286; 33/293; 33/299; 356/154; 356/396
[58] Field of Search ............... 356/138, 140, 153, 154, 356/170; 33/286, 293, 299

[56] References Cited

U.S. PATENT DOCUMENTS

| | | | |
|---|---|---|---|
| 2,285,281 | 6/1942 | Johnson | 356/153 |
| 2,811,074 | 10/1957 | Davidson | 356/154 |
| 2,915,940 | 12/1959 | Thomas et al. | 356/153 |

Primary Examiner—John K. Corbin
Assistant Examiner—R. A. Rosenberger
Attorney, Agent, or Firm—William F. Riesmeyer, III

[57] ABSTRACT

An optical gauging apparatus is provided for determining the deviation of a pipe end from squareness with respect to the pipe axis. A viewing scope is placed centrally in the pipe end to be measured so as to be directed at right angles thereto, and a graduated target is centrally located in the opposite end of the pipe. Sighting through the scope, the distance R of the intersection of the line of sight from the center of the target is determined. The deviation S from squareness may then be calculated from R, D the diameter of the pipe, and L the distance of the target from the end being measured, by the equation: $S = RD/L$.

9 Claims, 3 Drawing Figures

OPTICAL PIPE END-SQUARENESS GAUGE

BACKGROUND OF THE INVENTION

1. Field of the Invention:

An important factor in laying pipelines composed of a number of individual sections is how uniformly the ends of each section are cut. It is desirable that the pipe ends be as close to perpendicular to the pipe axis as possible so that when the sections are laid end-to-end the line will be straight. The American Petroleum Institute (API) has promulgated specifications 5L (Paragraph 7.3) and 5LX (Paragraph 6.7) which require that, "for pipe sizes 10¾ inches and larger, the ends shall be cut square within 1/16 inch, measured not less than three times per eight hour working shift". The term squareness refers to the plane of the pipe end being at right angles with respect to the axis, where the axis is the straight line through centerpoints of the pipe ends.

2. Prior Art:

No particular method of measurement is required in the API specifications. One method sometimes used is to place one leg of a carpenter's square along the top wall of the pipe, and measure the space between the other leg and the end of the pipe. Several readings are taken as the pipe is rolled along the floor so that the maximum deviation from squareness is determined. It is apparent that this method is subject to inaccuracies, many of which are due to curved pipe surfaces such as on pipe that is wavy or has hooked ends. Variations in the pipe diameter can also effect the readings. The method has another disadvantage in that it is time consuming since pipe must be removed individually from storage racks and placed on the floor for making the squareness determinations.

Another method of measurement sometimes used, is to place a pipe in the machine for facing the pipe ends, and mount a dial indicator in the tool holder of the machine. By rotating the pipe one full turn, (or the toolholder, if the pipe does not rotate) the reading on the dial indicates the theoretical deviation from squareness of the pipe end. The accuracy of this method is also affected by the degree of straightness of the pipe, and how it is mounted in the machine. This method also reduces productivity on the facing machines and is not desirable.

SUMMARY OF THE INVENTION

The apparatus of this invention includes a viewing scope having a reference mark to indicate a line of sight and a target with concentric graduated indicia. A means is provided for mounting the scope centrally in the plane of the pipe end which is to be measured, and at right angles to said plane. Also, a means is provided for centering the target in the opposite end of the pipe.

By sighting through the scope, the distance R from the intersection of the line of sight with the target to the center of the target, may be determined. The degree of deviation from squareness S may then be calculated from the equation $S = RD/L$.

Where D is the diameter of the pipe, and L is the distance along the pipe axis from the end being measured to the target.

It is a primary object of this invention to provide an optical gauging apparatus for determining by a single reading the maximum degree of deviation of a pipe end from squareness with respect to the pipe axis.

It is another object of this invention to provide an apparatus for rapidly determining the degree of deviation from squareness of a pipe end with respect to the pipe axis in any plane selected.

This and other objects of the invention will become more apparent from a reading of the specification, when taken in conjunction with the appended claims and drawings, in which:

DESCRIPTION OF THE PREFERRED EMBODIMENT

Figure 1:
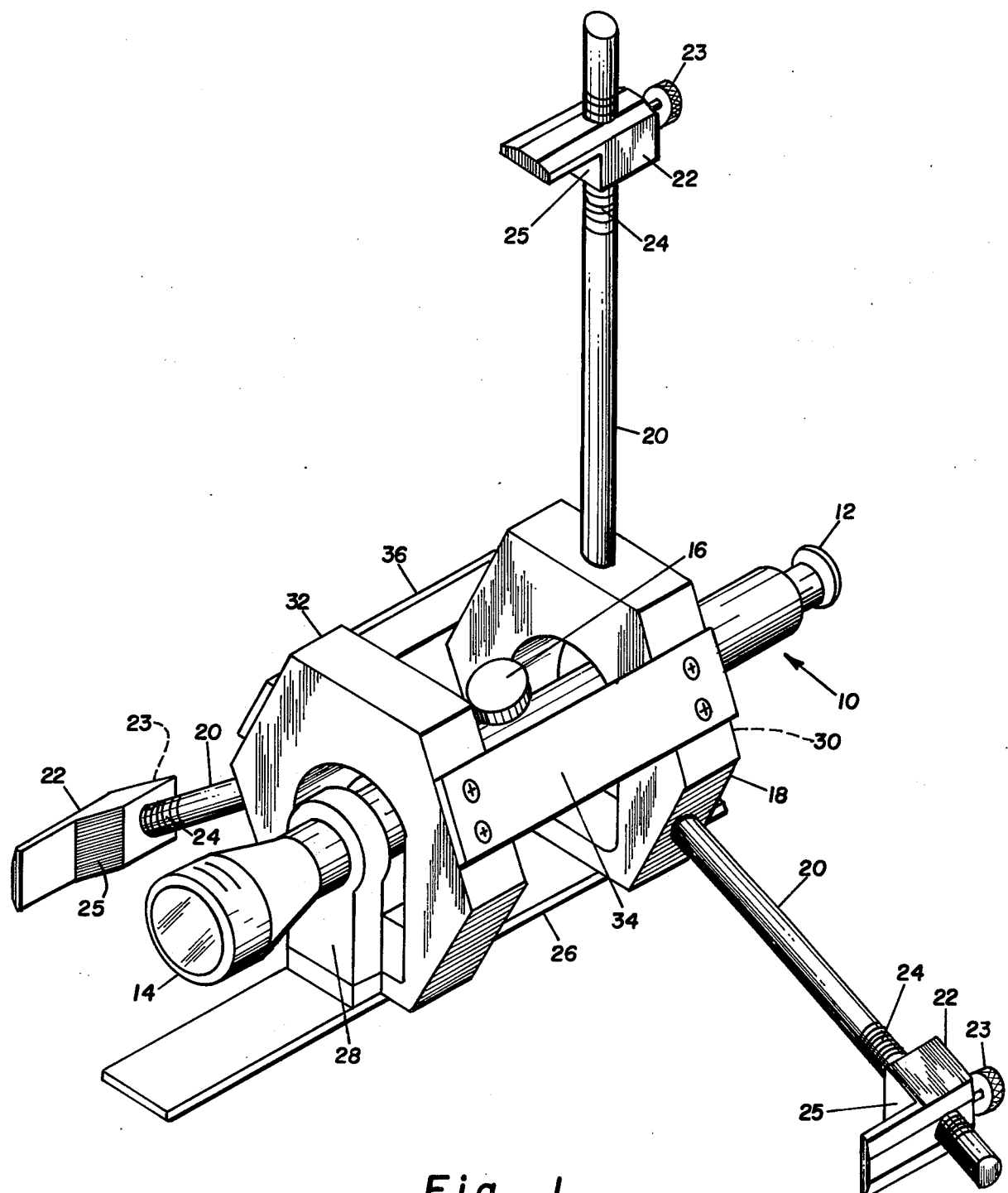
FIG. 1 is a perspective view of the scope and the means for centering the scope in the pipe to be measured.

Referring to FIG. 1, the apparatus of this invention includes a viewing scope 10 for installation in the plane of the pipe end which is to be gauged for squareness. Scope 10 has an eyepiece 12, a lens 14, and a focus adjustment knob 16. An axial reference mark (not shown) in the scope defines a line of sight for the viewer. Normally, I use a 24 power transit telescope.

Scope 10 is fixed in position on support base 18 with its axis substantilly normal to both the base, and also to the plane of a plurality of legs 20 radially extending from the base. Three legs spaced 120° from each other seem to work best. A slidable support shoe 22 is adjustably attached, such as by a thumb screw 23, to each leg for engaging the end of the pipe. A shoulder-forming recess 25 on each shoe is substantially complimentary to the received end of the pipe. Indicia 24 on each leg indicate predetermined positions of the shoes for engaging pipe ends of various diameters. By moving the shoes to their proper positions on the legs, scope 10 may be centered in the plane of the pipe end to be gauged, and consequently due to its fixed position on the base is directed at right angles to said plane.

Plate 26 extending from base 18 parallel to the scope and beyond lens 14 serves as a rest for the scope when it is laid down and protects it from damage. Members 28, 30 extending upwardly from plate 26 fix the scope in position on base 18. A section 32 joined to plate 26 and connected to the base by sideplates 34, 36 is spaced forwardly of the base so that the scope is forward weighted and will remain in the pipe end as minor adjustments are made in the shoe positions.

Figure 2:
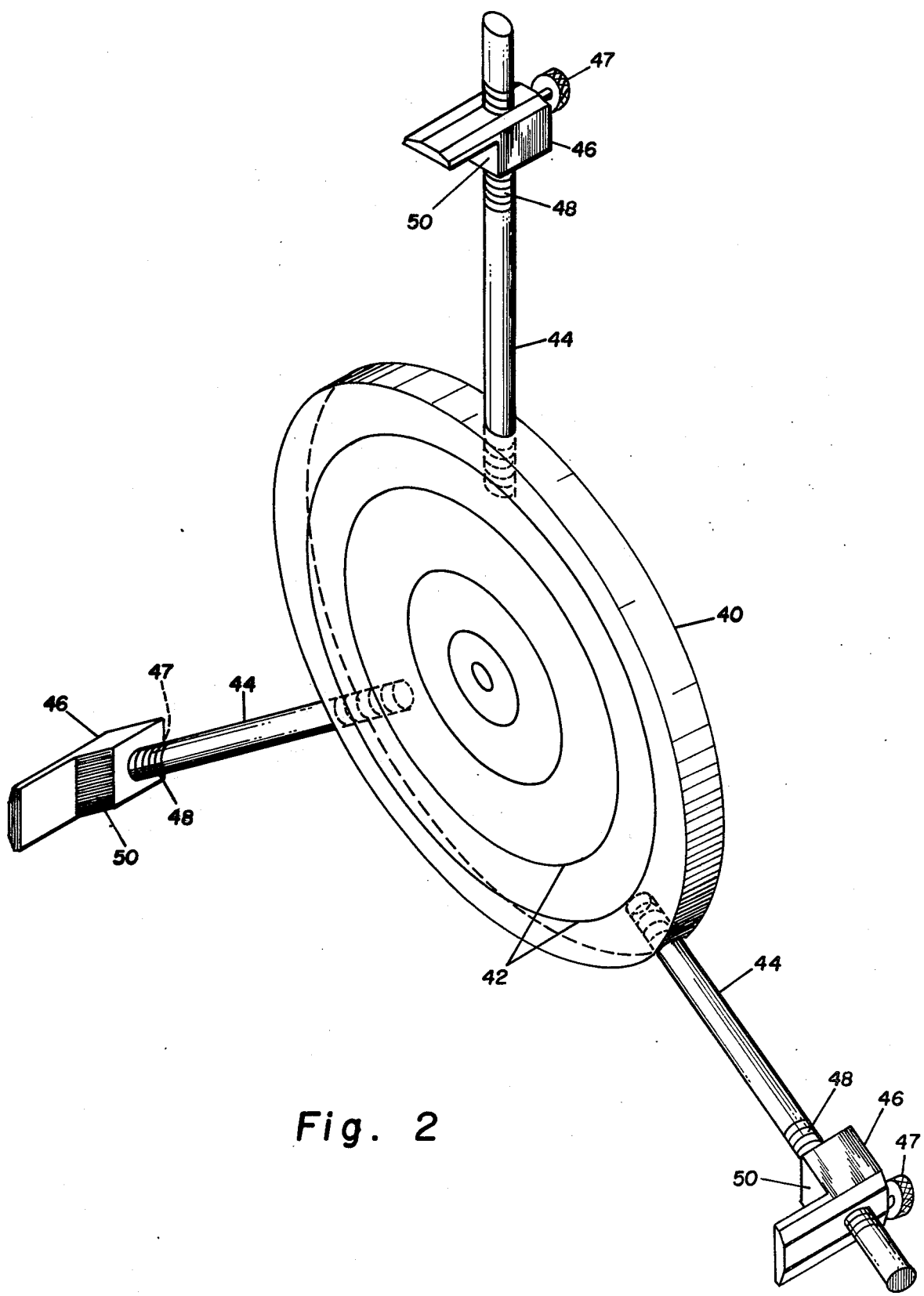
FIG. 2 is a perspective view of the target and the means for centering the target in the pipe end opposite from that being measured.

Referring now to FIG. 2, a planar target 40 is provided for mounting in the pipe end opposite from the end being gauged. Graduated indicia 42 on the target are concentrically spaced from its central axis. I have found that using a transparent plastic disc for the target material eliminates the need for backlighting. A translucent material would also serve the same purpose.

A plurality of legs 44 extend radially from the target and each have a slidable shoe 46, adjustably attached such as by a thumb screw 47, for engaging the pipe end. Again, three legs spaced 120° from each other are preferred. Indicia 48, on each leg indicate predetermined locations for positioning the shoes to engage pipes of various diameter. Each shoe has a shoulder-forming recess 50 substantially complimentary to the facing of the pipe end for mounting on the end remote from that being gauged. Thus, by setting the shoes at predetermined locations on the legs, the target may be mounted in a centered position with respect to the pipe end, i.e. with its centerpoint coincident with the pipe axis.

Figure 3:
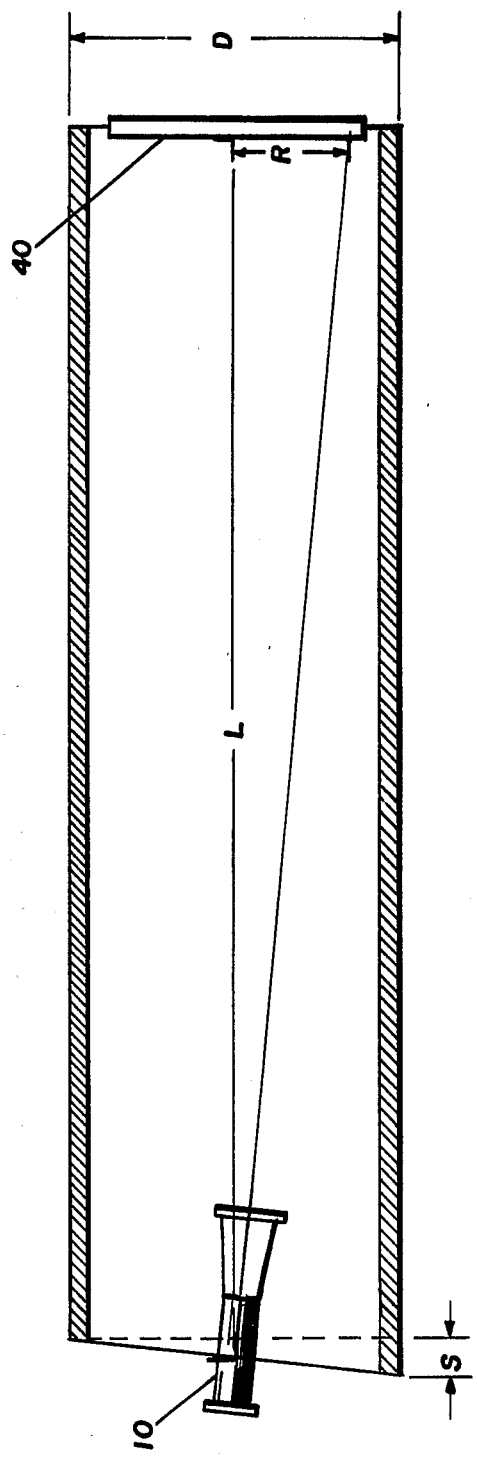
FIG. 3 is a diagrammatic illustration showing the scope in one end of a pipe and the target in an opposite end.

By viewing through scope 10 the distance R (on FIG. 3) from the intersection of the line of sight with the target 40, from its centerpoint, may be determined. Then, by calculation, the deviation S of the pipe end from squareness may be found from the equation $$S = R \times D/L$$

where D is the diameter of the pipe, and L is the distance of the target from the plane of the pipe end being measured along the axis of the pipe.

I claim:

1. Optical gauging apparatus for determining the degree of deviation from squareness of a pipe end with respect to the pipe axis comprising:
   a planar target having a central axis and concentric graduated indicia thereon positioned in the pipe end remote from the end being gauged;
   means for centering said target with respect to said pipe end;
   a viewing scope;
   means for positioning said viewing scope at right angles with respect to the plane of the pipe end being gauged and centrally therein;
   said viewing scope including a sighting means having an axial reference marking for determining, in association with said target indicia the degree of variance of the axis of said scope from the axis of said target;
   whereby the variation from squareness of said pipe end can be calculated from the formula:

$$S = RD/L$$

in which:
   S = the variation from squareness of said pipe end;
   R = the measured variance of said scope reference marking from the axis of said target;
   D = the diameter of said pipe; and
   L = the measured distance of said target from the end of the pipe being gauged.

2. Apparatus according to claim 1 in which said target centering means comprises a plurality of radially extending legs and a support shoe for engaging said pipe adjustably mounted on each of said legs.

3. Apparatus according to claim 2 in which said support shoes include means for engaging the end of said pipe remote from that being gauged.

4. Apparatus according to claim 1 in which said target is translucent.

5. Apparatus according to claim 2 in which said legs include indicia for locating said shoes at predetermined positions therealong.

6. Apparatus according to claim 1 in which the means for positioning said viewing scope includes:
   a support base mounting said viewing scope substantially normal to the axis thereof;
   a plurality of radially extending legs from said base; and
   a support shoe on each of said legs for engaging the end of said pipe being gauged.

7. Apparatus according to claim 6 in which said support shoes are adjustably attached to said legs.

8. Apparatus according to claim 7 in which said legs include indicia for locating said shoes at predetermined positions therealong.

9. Apparatus according to claim 6 in which said support shoe is provided with a shoulder-forming recess substantially complimentary of the received end of said pipe.

* * * * *